United States Patent
Soshin (10) Patent No.: US 9,274,936 B2
(45) Date of Patent: Mar. 1, 2016

(54) DATABASE CODE TESTING FRAMEWORK

(71) Applicant: Alexey Soshin, Ramat Gan (IL)

(72) Inventor: Alexey Soshin, Ramat Gan (IL)

(73) Assignee: SAP Portals Israel Ltd, Ra'anana (IL)

(*) Notice: Subject to any disclaimer, the term of this patent is extended or adjusted under 35 U.S.C. 154(b) by 58 days.

(21) Appl. No.: 13/904,238

(22) Filed: May 29, 2013

(65) Prior Publication Data

US 2014/0359581 A1 Dec. 4, 2014

(51) Int. Cl.
*G06F 11/36* (2006.01)
*G06F 17/30* (2006.01)

(52) U.S. Cl.
CPC ........ *G06F 11/3692* (2013.01); *G06F 11/3688* (2013.01); *G06F 11/3664* (2013.01); *G06F 17/30289* (2013.01)

(58) Field of Classification Search
None
See application file for complete search history.

(56) References Cited

U.S. PATENT DOCUMENTS

| | | | |
|---|---|---|---|
| 6,587,543 B1 * | 7/2003 | Howard et al. | 379/10.01 |
| 6,701,514 B1 | 3/2004 | Haswell et al. | |
| 6,907,546 B1 | 6/2005 | Haswell et al. | |
| 6,951,013 B1 * | 9/2005 | Lozins | G06F 11/3688 714/E11.207 |
| 7,010,546 B1 * | 3/2006 | Kolawa | G06F 11/3688 707/694 |
| 7,316,004 B2 * | 1/2008 | Sluiman et al. | 717/125 |
| 7,720,879 B2 | 5/2010 | Tsyganskiy et al. | |
| 7,831,614 B2 | 11/2010 | Deffler | |
| 7,953,744 B2 * | 5/2011 | Gharat et al. | 707/758 |
| 8,095,636 B2 * | 1/2012 | Linville et al. | 709/223 |
| 8,312,436 B2 * | 11/2012 | Barry et al. | 717/135 |
| 8,645,326 B2 | 2/2014 | Weizman et al. | |
| 8,732,656 B2 | 5/2014 | Ahadian et al. | |
| 2003/0033291 A1 | 2/2003 | Harris | |
| 2003/0126586 A1 * | 7/2003 | Sluiman et al. | 717/124 |
| 2003/0212986 A1 * | 11/2003 | Nelin | G06F 11/3664 717/124 |
| 2005/0086195 A1 * | 4/2005 | Tan | G06F 17/30289 |
| 2005/0197998 A1 | 9/2005 | Asbury | |
| 2007/0180094 A1 | 8/2007 | Roth | |
| 2008/0222609 A1 * | 9/2008 | Barry et al. | 717/124 |
| 2008/0313611 A1 * | 12/2008 | Linville et al. | 717/115 |
| 2010/0005340 A1 * | 1/2010 | Belknap | G06F 11/3688 714/37 |
| 2010/0192006 A1 * | 7/2010 | Gharat et al. | 714/5 |
| 2011/0271137 A1 | 11/2011 | Krieg et al. | |
| 2012/0005190 A1 | 1/2012 | Faerber et al. | |

(Continued)

OTHER PUBLICATIONS

Fix, G., The Design of an Automated Test Code Generation System for SQL Stored Procedures, 2011 Eighth International Conference on Information Technology: New Generations (ITNG), Apr. 11-13, 2011, pp. 286-290, [retrieved on 11/7/15], Retrieved from the Internet: <URL:http://ieeexplore.ieee.org/>.*

McCaffrey, J. D., SQL Stored Procedure Testing: NET Test Automation Recipes: A Problem-Solution Approach (2006), pp. 237-264, [retrieved on Nov. 7, 2015], Retrieved from the Internet: <URL:http://link.springer.com/>.*

(Continued)

*Primary Examiner* — Thuy Dao
*Assistant Examiner* — Geoffrey St Leger
(74) *Attorney, Agent, or Firm* — Fish & Richardson P.C.

(57) ABSTRACT

The present disclosure involves systems, software, and computer-implemented methods for providing an integrated testing framework within a database system for testing database code. An example method includes identifying a test script associated with a database, identifying an expected result to be produced by the test script, the expected result stored in an expected results table in the database, executing the test script within the database, where executing the test script produces an actual result, and comparing, within the database, the actual result produced by the test script with the expected result from the expected results table to determine a success condition associated with the execution of the test script.

20 Claims, 5 Drawing Sheets

(56) References Cited

U.S. PATENT DOCUMENTS

| | | |
|---|---|---|
| 2012/0110030 A1 | 5/2012 | Pomponio |
| 2012/0233598 A1* | 9/2012 | Gyure et al. ............... 717/124 |
| 2013/0007522 A1* | 1/2013 | Kurapati et al. ............. 714/32 |
| 2013/0055197 A1 | 2/2013 | Balan et al. |
| 2013/0117609 A1* | 5/2013 | Dande ............. G06F 11/3692 714/32 |
| 2014/0006459 A1 | 1/2014 | Guo et al. |
| 2014/0123114 A1 | 5/2014 | Navalur et al. |

OTHER PUBLICATIONS

Alexey Soshin, U.S. Appl. No. 13/331,703, filed Dec. 20, 2011 entitled: Analyzing and Representing Interpersonal Relations.

Alexey Soshin, U.S. Appl. No. 13/535,565, filed Jun. 28, 2012 entitled: Model Entity Network for Analyzing a Real Entity Network.

Alexey Soshin, U.S. Appl. No. 13/535,619, filed Jun. 28, 2012 entitled: Ranking Search Results Using an Entity Network.

Alexey Soshin, U.S. Appl. No. 13/539,996, filed Jul. 16, 2012 entitled: Visually Representing Entity Relationships.

\* cited by examiner

| TEST NAME | EXPECTED RESULT |
|---|---|
| test_is_more_than_10 | 0, 0, 0, 1, 0 |

302 {
```
create procedure test_is_more_than_10 as
--@tests: is_more_than   ~304
BEGIN
        call is_more_than_10 (1);
        call is_more_than_10 (20);
END;
```
}

308 {
```
create procedure test_is_more_than_20 as
--@tests: is_more_than   ~310
BEGIN
        call is_more_than_20 (21);
        call is_more_than_20 (1);
        call is_more_than_20 (30);
END;
```
}

`call run_tests ('belongs_is_more_than')`

| TEST NAME | EXPECTED RESULT |
|---|---|
| test_is_more_than_10 | 0, 1 |
| test_is_more_than_20 | 1, 0, 1 |

DATABASE CODE TESTING FRAMEWORK

TECHNICAL FIELD

The present disclosure involves systems, software, and computer-implemented methods for providing an integrated testing framework within a database system for testing database code.

BACKGROUND

Modern databases generally allow users to create software code within the database. This code is generally written in a programming language supported by the database, and may also include stored procedures, triggers, applications, programs, scripts, or any other suitable name. The code may provide functionality for use within the data retrieval functions of the database, for example, allowing data processing, formatting, or other operations to be performed directly within a query.

Software developers generally author test scripts to test code to ensure it functions as intended. For example, a software developer may create a test script for a function that performs the addition of two numbers that passes the function the numbers "1" and "2" as parameters and ensures that the function returns the correct results (e.g., "3").

SUMMARY

The present disclosure involves systems, software, and computer-implemented methods providing an integrated testing framework within a database system for testing database code. In one general aspect, an example method includes identifying a test script associated with a database, identifying an expected result to be produced by the test script, the expected result stored in an expected results table in the database, executing the test script within the database, where executing the test script produces an actual result, and comparing, within the database, the actual result produced by the test script with the expected result from the expected results table to determine a success condition associated with the execution of the test script.

While generally described as computer-implemented software embodied on non-transitory, tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

The present disclosure involves systems, software, and computer-implemented methods providing an integrated testing framework within a database system for testing database code.

Software development processes generally include a testing phase for performing automated testing of software code. Whether the code runs as a stand-alone application, or is stored and executed within a database (e.g., a stored procedure, a trigger, etc.), the code author may desire to construct automated tests to ensure that the code performs as intended. Such tests can be helpful when adding new functionality to existing code, or when ensuring that the code performs as intended in a new environment, such as a newly provisioned computer or a new version of a database.

In modern database applications, large amounts of custom code may be added to implement specific business cases. Whether the code is implementing a large application within the database or many small functions to perform operations within query statements, it may be desirable to perform automated testing on this database code. One possible approach to this would be to an external testing framework outside the database to test the code within the database, however, such an approach could be difficult to manage and be unnecessarily complex. For example, an external testing framework, such as a Java or C# test framework, may connect to the database via a driver in order to test the internal database code, which introduces an additional layer of complexity and the possibility of problems with the driver affecting test results.

In some implementations, the present solution may allow testing of database code within the database itself without the need for an external testing framework. The solution may allow authoring of a series of test scripts that execute database code and provide the code with known parameters. An expected result for each test script may then be inserted into a table for each of the test scripts. A test wrapper function may then be called with the test script passed as a parameter to the function. The test wrapper function may then call the test script and compare the actual result produced by the test script with the expected result stored in the table for the test script. If the actual result is equal to the expected result, the test script is successful and the database code being tested has performed as intended. If the actual result is not equal to the expected result, the test script has failed and the database code being tested has not performed as intended.

The present solution also allows test scripts to be grouped into test batteries including multiple test scripts. In some implementations, these test batteries may be created by flagging different test scripts with a common tag for the test battery in an annotation within the test scripts themselves. The test wrapper function may then be called with the corresponding test battery tag, causing the test wrapper function to run all the test scripts in that particular battery based on the common annotation.

In some implementations, the test wrapper function may be configured to execute the test battery in different ways. For example, the test wrapper function may be configured to run each test script in the test battery and provide results showing which tests passed and which failed after all tests have run. In another example, the test wrapper function may be configured to stop execution of the test battery after any test script fails. The test wrapper function may also be configured to execute all the test scripts in the test battery synchronously such that only one test script is executed at a time. In some cases, the test wrapper function may be configured to execute the test scripts within the test battery simultaneously (such as within their own processing threads), or to execute parts of the test battery simultaneously and others sequentially. In some implementations, the test wrapper function may be configured as described above by passing it different parameters at execution time.

In some cases, the test scripts may include annotations that may be interpreted by the test wrapper function and provide information about how the test script should be run. For example, a test script may include an annotation stating a max time it should be allowed to run. If the test wrapper function observes that the test script has taken longer than the max time to run, it may treat the test script as having failed.

The present solution provides several advantages. The solution may be integrated into a database product, such that a user need not purchase or administer a separate testing framework in order to test code authored within the database. The database code authoring and testing process may also be simplified by not having to execute an external testing framework to verify the database code. Additional advantages will be understood by those of ordinary skill in the art from the disclosure.

Figure 1:
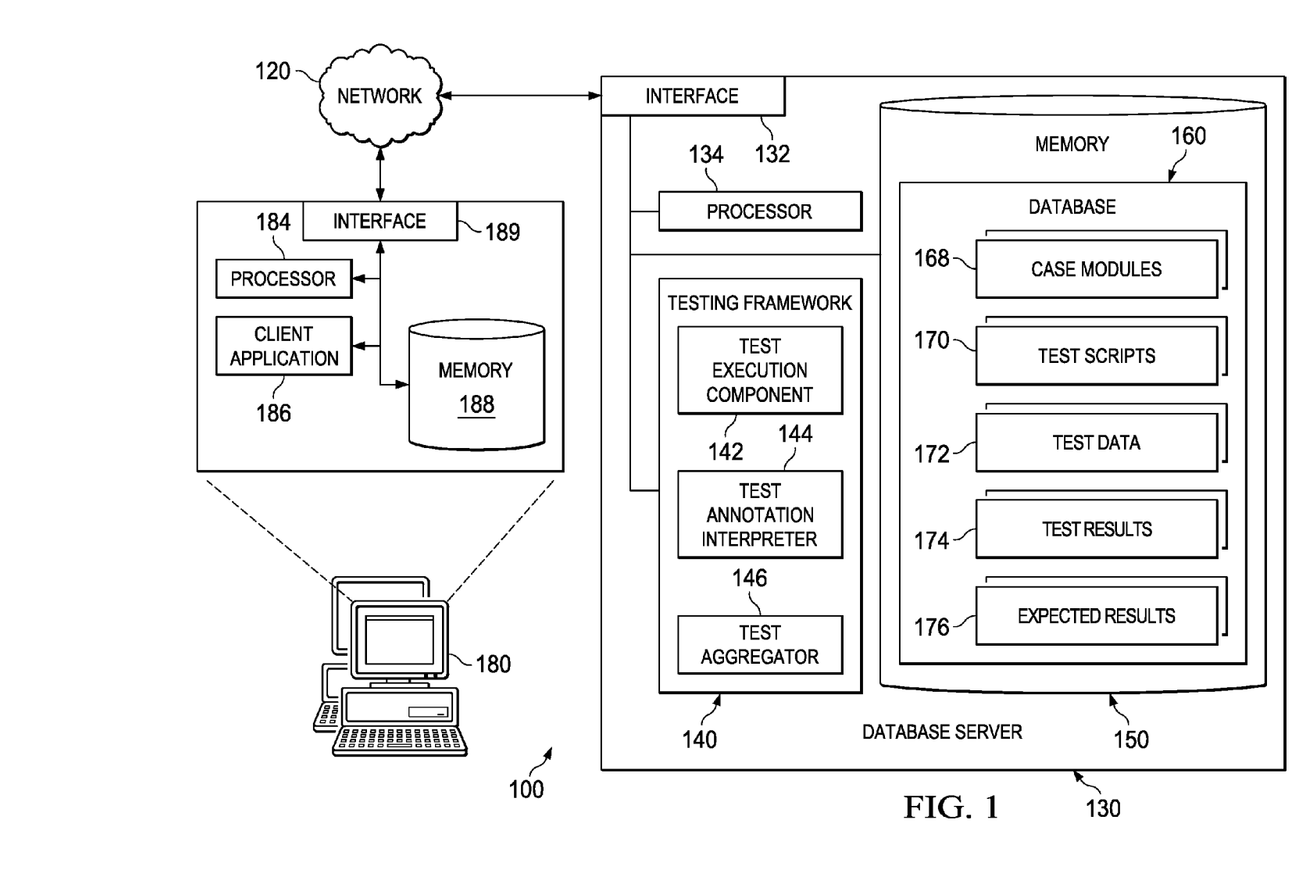
FIG. 1 is a block diagram illustrating an example system for allowing database scripts to be tested within a database.

FIG. 1 is a block diagram illustrating an example system 100 for providing an integrated testing framework within a database for testing database code. As shown, the example system 100 includes a database server 130 and one or more clients 180 connected to the database server 130 by a network 120. In operation, the database server 130 may execute a testing framework 140. The testing framework 140 may include a test execution component 142 that reads test scripts 170 from the database 160. Each test script 170 is associated with an expected result 176. The test execution component 142 executes the test script 170 and compares the actual result of the test script 170 with the expected result 176 associated with the test script 170. If the values are equal, the test script 170 has passed. If not, the test script 170 has failed.

In the illustrated implementation, the example system 100 includes a database server 130. At a high level, the database server 130 comprises an electronic computing device operable to receive, process, store, retrieve, and manage data associated with the environment 100. Specifically, the database server 130 illustrated in FIG. 1 is responsible for receiving, retrieving, or otherwise identifying data from the database 160 in response to messages from various clients, such as clients 180, and performing the requested action on the data. For example, the clients 180 may submit Structure Query Language (SQL) queries to the database server 130 specifying database to be retrieved. The database server 130 may respond by retrieving the specified data from the database 160 and returning it to the clients 180.

The database server 130 may also receive requests from the clients 180 to create, modify, or execute code modules 168 within the database 160. In some implementations, the code modules 168 may include stored procedures, triggers, or any other suitable executable database artifact/entity/code. The database server 130 may also receive requests from the clients 180 to create, modify, or execute test scripts 170 within the database 160. In some implementations, test scripts 170 are created, modified, or executed by the same mechanism as the code modules 168. The test scripts 170 and code modules 168 will be discussed in greater detail below.

As used in the present disclosure, the term "computer" is intended to encompass any suitable processing device. For example, although FIG. 1 illustrates a database server 130, environment 100 can be implemented using two or more servers, as well as computers other than servers, including a server pool. Indeed, database server 130 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, illustrated database server 130 may be adapted to execute any operating system, including Linux, UNIX, Windows, Mac OS®, Java™, Android™, iOS or any other suitable operating system. According to one implementation, database server 130 may also include or be communicably coupled with an e-mail server, a Web server, a caching server, a streaming data server, and/or other suitable server.

The database server 130 also includes an interface 132, a processor 134, and a memory 150. The interface 132 is used by the database server 130 for communicating with other systems in a distributed environment—including within the environment 100—connected to the network 120; for example, the clients 180, as well as other systems communicably coupled to the network 120 (not illustrated). Generally, the interface 132 comprises logic encoded in software and/or hardware in a suitable combination and operable to communicate with the network 120. More specifically, the interface 132 may comprise software supporting one or more communication protocols associated with communications such that the network 120 or interface's hardware is operable to communicate physical signals within and outside of the illustrated environment 100.

As illustrated in FIG. 1, the database server 130 includes a processor 134. Although illustrated as a single processor 134 in FIG. 1, two or more processors may be used according to particular needs, desires, or particular implementations of environment 100. Each processor 134 may be a central processing unit (CPU), a blade, an application specific integrated circuit (ASIC), a field-programmable gate array (FPGA), or another suitable component. Generally, the processor 134 executes instructions and manipulates data to perform the operations of the database server 130. Specifically, the processor 134 may execute the functionality required to receive and respond to requests from the clients 180.

The illustrated database server 130 also includes a testing framework 140. In some implementations, the testing framework 140 may be a set of stored procedures residing within the database 160 that may be used to execute the test scripts 170 and verify that the results the scripts produce match the expected results 176. Although the testing framework 140 is shown as a separate component from the database 160 in FIG. 1, in some implementations, the test framework 140 may be integrated within the database 160. The test framework 140 may also be included on the database server 130, or on a separate server or other computer device within a larger distributed database system including the database server 130.

In the depicted implementation, the database server 130 includes a test execution component 142. In some cases, the test execution component may execute the test scripts 170 and compare the results produced by the test scripts 170 to the expected results 176. If the results produced by a particular test script 170 do not match the associated expected result from the expected results 176, then that test script has failed. In some implementations, the test execution component 142 receives a parameter indicating one or more test scripts from the set of test scripts 170 to run. The parameter may be the name of a single test script, the name of a group of test scripts (e.g. a test battery), or a variable referencing a particular test script name, among others. The test grouping functionality is discussed in greater detail below.

In some implementations, the test execution component 142 may run multiple tests and provide a report indicating the results of each test. The test execution component 142 may also be configured to stop execution at the first failed test. In some implementations, the test execution component 142 may execute multiple tests simultaneously, such as by allocating a separate thread for each test. The test execution component 142 may also execute a set of multiple tests sequentially, such that only one test is run at once. In some implementations, the test execution component 142 may have one or more parameters passed to it at runtime to control these, or other, behaviors.

The database server 130 may also include a test annotation interpreter 144. In some implementations, the test annotation interpreter 144 parses the test scripts 170 to extract annotations from the code. These annotations may include information or directives to be used by the testing framework 140 and to be used when executing the test script 170. For example, an annotation may be in the form of a specially formatted comment included in the test scripts 170, such as "--@tests:group1." In some implementations, this indication may be interpreted by the test annotation interpreter as including the test scripts within the test battery called "group1." In another example, an annotation of "--@max_time:10s" in a test script may indicate that the test script should be given no longer than ten seconds to run, where if execution exceeds the max time then the test script should be treated as failed test. Note that the format of the annotations above is merely an example, and other formats are contemplated by the present disclosure.

As shown, the database server 130 may include a test aggregator 146. In some implementations, the test aggregator 146 is called by the test execution component 142 when the test execution component 142 is provided a test group name. The test aggregator 146 may search through the test scripts 170 to identify one or more test scripts included in the specified test group. For example, if the test execution component 142 is passed a group name of "group1," the test aggregator 146 may search the test scripts 170 for individual test scripts that include an annotation identifying or otherwise linking a particular test script as related to the specified group (e.g., "--@tests:group1"). In such cases, the test aggregator 146 may interact with the test annotation interpreter 144 to extract the group information from the individual test scripts 170. In some implementations, test groups may be explicitly defined within a table in the database, and the test aggregator 146 may read the group information from the table. Additionally, specific naming conventions may be provided to allow the test script names to be used to group particular tests into test groups.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The database server 130 also includes a memory 150, or multiple memories 150. The memory 150 may include any type of memory or database module and may take the form of volatile and/or non-volatile memory including, without limitation, magnetic media, optical media, random access memory (RAM), read-only memory (ROM), removable media, or any other suitable local or remote memory component. The memory 150 may store various objects or data, including caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the database server 130. Additionally, the memory 150 may include any other appropriate data, such as VPN applications, firmware logs and policies, firewall policies, a security or access log, print or other reporting files, as well as others.

As illustrated in FIG. 1, memory 150 includes or references data and information associated with and/or related to providing the integrated testing framework. As illustrated, memory 150 includes a database 160. The database 160 may be one of or a combination of several commercially available database and non-database products. Acceptable products include, but are not limited to, SAP® HANA DB, SAP® MaxDB, Sybase® ASE, Oracle® databases, IBM® Informix® databases, DB2, MySQL, Microsoft SQL Server®, Ingres®, PostgreSQL, Teradata, Amazon SimpleDB, and Microsoft® Excel, as well as other suitable database and non-database products. Further, database 160 may be operable to process queries specified in any structured or other query language such as, for example, Structured Query Language (SQL).

As shown in FIG. 1, the database 160 includes the set of code modules 168 mentioned above. In some implementations, the code modules 168 may include functionality to process, format, transform, or otherwise operate on data stored in the database 160. In some implementations, the code modules 168 may be stored procedures, triggers, or any other suitable type of executable database artifact or code. For example, the code modules 168 may include code to perform arithmetic operations on a series of numbers, such as summing or averaging the numbers. The code modules 168 may be called from inside a query to perform operations on the data retrieved by the query before being returned to the requester. For example, given a stored procedure called "SUM," an SQL query of "SELECT SUM(X) FROM TABLE" would return a value representing all the values of X from TABLE added together (e.g., a sum). Code modules 168 may also include much more detailed functionality—the SUM procedure is meant to be an example. In some cases, the code modules 168 may be implemented in a database scripting language, such as, for example, SQL Procedural Language (PL/pgSQL), SQLScript, Microsoft® SQL, or any other suitable language.

The database 160 may also include a set of test scripts 170. In some implementations, the test scripts 170 may be stored procedures, triggers, or any other suitable type of executable database artifact and/or code. The test scripts 170 may be used to test the code modules 168 to ensure that the modules function as intended. Given the "SUM" stored procedure discussed above, a test script 170 may be written to test the functionality by providing the SUM stored procedure with known parameters and ensuring that it returns the correct and expected result. For example, the test script 170 may pass the SUM stored procedure the parameters 2 and 1, and ensure that the SUM stored procedure returns the sum of these two parameters (e.g., 3). In some implementations, the test script 170 may use data from the database 160 (such as test data 172) to test its associated code module 168. For example, the test script 170 may select data from a table including the values 2 and 1, and include the SUM stored procedure in the query. The test script 170 may then check the value returned by the query to ensure that the SUM stored procedure has produced the correct result. In some implementations, the test script 170 may utilize other data in the database besides the test data 172, such as data associated with other running applications on the database server 130. The test script 170 may also utilize external data from sources outside the database server 130 in testing the code module 168.

In some implementations, there may be a one-to-one correspondence between test scripts 170 and code modules 168, such that each code module 168 has its own associated test script 170. In some cases, certain of the code modules 168 may be associated with multiple test scripts 170. The test scripts 170 may be implemented in a database scripting language, such as, for example, PL/pgSQL, SQLScript, Microsoft® SQL, or any other suitable language.

In some implementations, the database 160 may include a set of test data 172. As discussed above, the test data 172 may be used by the test scripts 170 in testing the code modules 168. In some implementations, the test data 172 may be stored in a single table, or, alternatively, multiple tables, as appropriate. In some cases, the test data 172 may be organized according to the test script 170 to which it is associated. For example, the test data 172 may be stored in a table having a primary key that identifies to which of the test scripts 170 the data is associated. In some implementations, the test data 172 may include static data chosen by the developer of the test scripts 170. The test data 172 may also include dynamic data generated by an internal or external system.

The database 160 includes a set of test results 174. In some implementations, the set of test results 174 includes historical records of past runs of the test scripts 170. For example, if a test script 170 was run by the test execution component 142 and failed, a record may be inserted into the set of test results 174 representing that run and indicating the run failed. In some implementations, the set of test results 174 is stored in a table or set of tables within, or external to, the database 160. The table for storing the test results 174 may include various information about the test run, including, but not limited to, the name of the test, a beginning timestamp, an ending timestamp, a status (e.g., pass or fail), parameters used in the test run, a status message indicating the reason the test failed, or any other suitable information. In some implementations, the test results 174 may include a results column for storing the result of an execution of a particular test script 170. The test execution component 142 may compare the result to the expected result 176 for the particular test script in order to determine whether the test script 170 passed or failed.

In the illustrated implementation, the database 160 also includes a set of expected results 176. In some implementations, each of the expected results 176 is associated with a particular one of the test scripts 170, and indicates the results that an execution of the corresponding test script should produce to be considered successful. In some implementations, the set of expected results 176 is stored in a table or set of tables within the database 160. The expected results 176 may include information identifying the associated test script, as well as representation of the expected results of the associated test script. For example, if a particular test script produced the values "0, 1, 1, 0, 1," the expected result for that test script would include the values "0, 1, 1, 0, 1." The test execution component 142 would compare the result produced when the test group was run to this expected value stored in the data. If the value produced by the test script and the expected value are equal, then the test script was executed successfully. In some implementations, the expected results 176 are provided by the testing user in the parameters of the test script 170 prior to runtime, such as, for example, in an annotation.

The illustrated environment of FIG. 1 also includes a client 180, or multiple clients 180. Client 180 may be any computing device operable to connect to or communicate with at least the database server 130 via the network 120 using a wireline or wireless connection. In general, client 180 comprises an electronic computer device operable to receive, transmit, process, and store any appropriate data associated with environment 100 of FIG. 1.

There may be any number of clients 180 associated with, or external to, environment 100. For example, while the illustrated environment 100 includes one client 180, alternative implementations of environment 100 may include multiple clients 180 communicably coupled to the database server 130 and/or the network 120, or any other number suitable to the purposes of environment 100. Additionally, there may also be one or more additional clients 180 external to the illustrated portion of environment 100 that are capable of interacting with the environment 100 via the network 120. Further, the term "client" and "user" may be used interchangeably as appropriate without departing from the scope of this disclosure. Moreover, while client 180 is described in terms of being used by a single user, this disclosure contemplates that many users may use one computer, or that one user may use multiple computers.

Illustrated client 180 is intended to encompass any computing device such as a desktop computer, laptop/notebook computer, wireless data port, smart phone, personal data assistant (PDA), tablet computing device, one or more processors within these devices, or any other suitable processing device. For example, client 180 may comprise a computer that includes an input device, such as a keypad, touch screen, or other device that can accept user information, and an output device that conveys information associated with the operation of the database server 130 or client 180 itself, including digital data, visual information, or a graphical user interface (GUI). Client 180 may include an interface 189, a processor 184, a memory 188 and a client application 186. Client 180 may be used by a user to access the database server 130, to view or change items in the database 160 (such as test scripts 170), or to view test results 174.

Figure 2A:
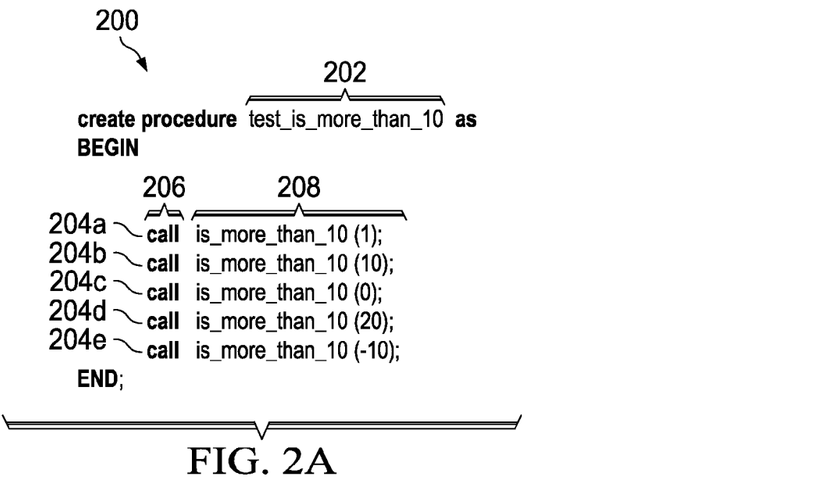
FIGS. 2A-C illustrate an example test script, an example call of the test script, and an example expected results table storing the expected result for the test script.
Figure 2B:
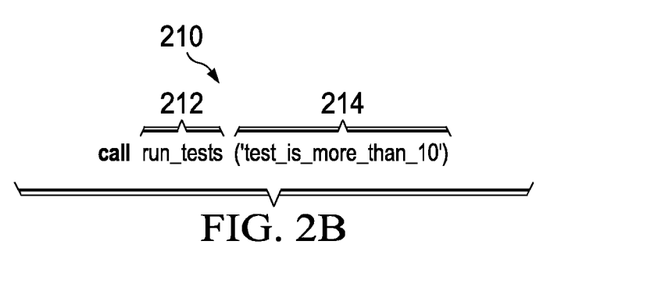
Figure 2C:
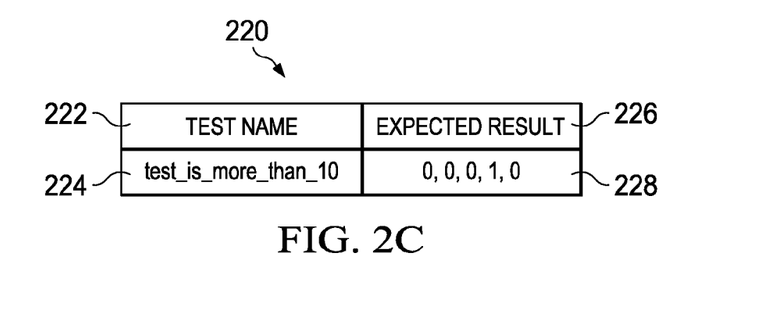

FIGS. 2A-C illustrate an example test script 200, an example call 210 of the test script 200, and an example expected results table 220 storing the expected result for the test script. As shown in FIG. 2A, the test script 200 is implemented as a database stored procedure, as indicated by the code beginning with "create procedure." The test script 200 includes a test name 202 ("test_is_more_than__10"). The test name 202 may be used to call or refer to the test script 200, such as in the example call 210 discussed below.

As shown, the test script 200 includes multiple instructions 204a-e. Each of the instructions 204a-e includes an execution keyword 206 (e.g., "call") and a procedure call 208. Each of the instructions 204a-e will produce a result, which will be collected into a result set returned from the test script 200. For example, assume that the "is_more_than__10" procedure returns "1" if the passed parameter is more than 10 and "0" otherwise. In this case, the test script 200 would produce the following result: "0, 0, 0, 1, 0." This result may be compared to the expected result for the test script 200 to determine if the test was successful, as discussed below.

FIG. 2B shows an example call 210 of the test script 200 according to the testing framework of the present disclosure. The example call 210 may include a test wrapper function 212. In some implementations, the test wrapper function 212 takes the name of the test script to run, or the test script name 214 of 'test_is_more_than__10' as in the illustrated example. The test wrapper function 212 may then run the test script associated with the test script name 214 (i.e., test script 200), and note the result produced by the test script. The test wrapper function 212 may then compare the results produced by the test script to the expected result associated with the test script as identified in the expected results table 220, shown in FIG. 2C. As provided, the expected results table 220 includes a test name column 222 and an expected result column 226. The test wrapper function 212 may query the expected results table 220 using the test script name 214 and retrieve the expected result associated with the test script 200. The test wrapper function 212 may then compare the observed result of the test script 200 with the expected result 228 associated with the matching test name 224 from the expected results table 220. If the observed result in the expected result 228 match, the test script 200 may be considered passed. In some instances, an exact match may be required, while in others, a substantial match may satisfy the test. Otherwise, test script 200 may be considered as having failed. In some implementations, the expected result 228 substantially matches an observed result if the expected result 228 and the observed result are identical, or differ in trivial ways, such as in the order of results in a series, rounding, or other acceptable variations from the expected results 228.

Figure 3A:
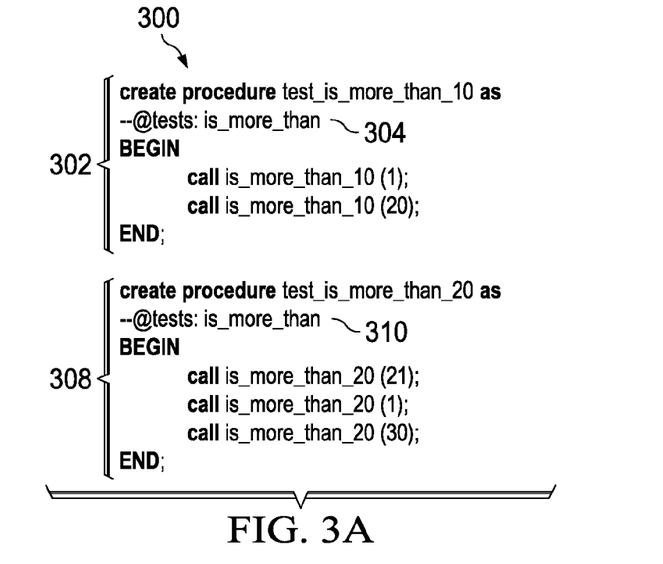
FIGS. 3A-C illustrate an example test battery, an example call of the test battery, and an example expected results table storing the expected result for the test scripts within the test battery.
Figure 3B:
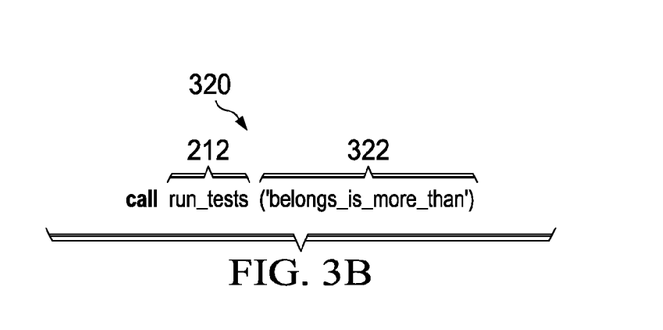
Figure 3C:
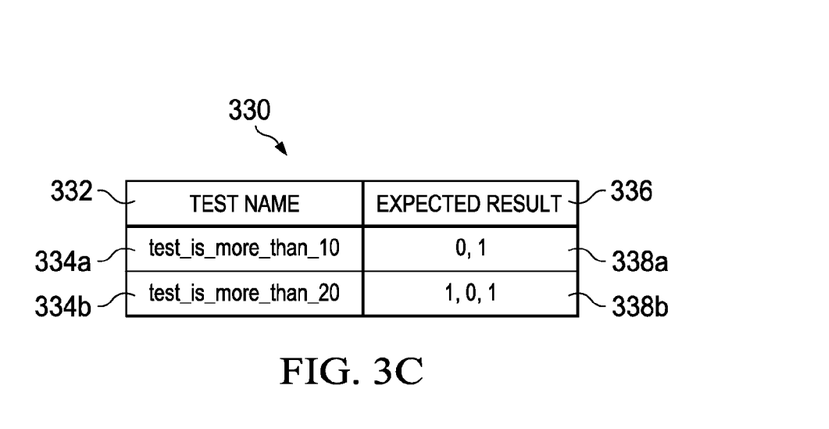

FIGS. 3A-C illustrate an example test battery 300, an example call 320 of the test battery 300, and an example expected results table 330 storing the expected result for the test scripts within the test battery 300. As shown, the test battery 300 includes two test scripts 302 and 308. The test scripts 302 and 308 include annotations 304 and 310, respectively. The annotations 304 and 310 specify that the test scripts 302 and 308 belong to the test battery named "is_more_than." This test battery name is used in the example call 320, where the test wrapper function 212 is passed the parameter 322 including the text "belongs:is_more_than." The parameter 322 instructs the test wrapper function 212 to run all tests belonging to or associated with the test battery named "is_more_than." As the test scripts 302 and 308 both belong to this test battery, both test script may be run by the example call 320.

The test wrapper function 212 compares the results produced by the test scripts 302 and 308 to the expected results table 330 shown in FIG. 3C. The expected results table 330 may include a test name column 332 and expected result column 336. As shown, the test names 334*a-b* are associated with the expected results 338*a-b*. The test wrapper function 212 compares the observed results of the test scripts 302 and 308 to the expected results 338*a-b*. If the observed results of the test scripts 302 and 308 match (or substantially match, in some instances) the appropriate expected result from the expected results table 330, the test scripts 302 and 308 may be considered as having been successful. Otherwise, test scripts 302 and 308 may be considered as having failed.

Figure 4:
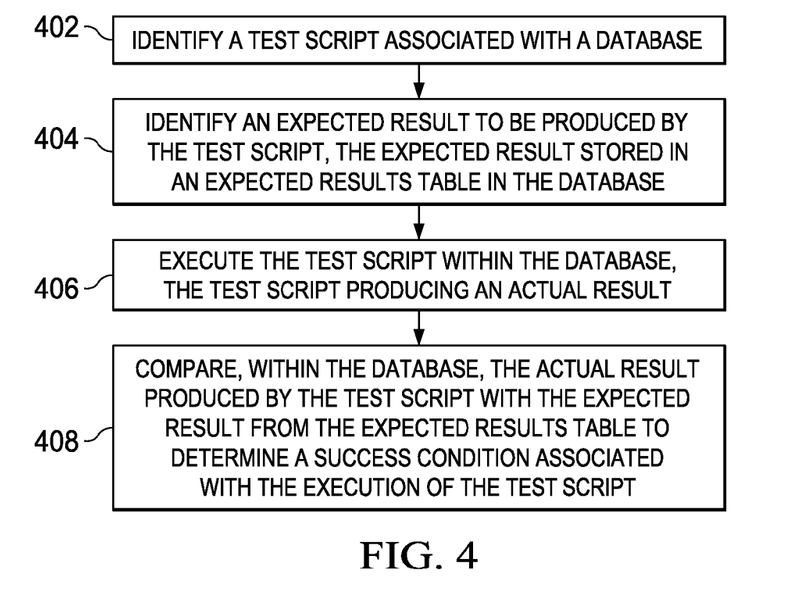
FIG. 4 is a flowchart of an example method for allowing database scripts to be tested within a database.

FIG. 4 is a flowchart of an example method 400 for allowing database scripts to be tested within a database. For clarity of presentation, the description that follows generally describes method 400 in the context of FIG. 1. However, it will be understood that method 400 may be performed, for example, by any other suitable system, environment, software, and hardware, or a combination of systems, environments, software, and hardware, as appropriate. For example, one or more of the database server, the client, or other computing device (not illustrated) can be used to execute method 400 and obtain any data from the memory of the client, the database server, or the other computing device (not illustrated).

At 402, a test script associated with a database is identified. In some implementations, identifying the test script may include selecting the test script name from a table. Identifying the test script may also include receiving a command from a user or system to execute the test script.

At 404, an expected result to be produced by execution of the test script is identified. In some instances, the expected result may be stored in an expected results table in the database. In some implementations, the expected result may be identified by the author of the test script at design time. For example, an author writing a test script may insert a row indicating the expected result of the test script into the expected results table in the database. In some implementations, the expected results may be produced automatically by analyzing the contents of the test script, or by analyzing past results of the test script. Additionally, a request to execute the test script may include, as a passed parameter, the set of expected results for the particular test, such as a listed array of values.

At 406, the test script is executed within the database, the test script producing an actual result. By comparing this actual result to the expected result for the test script (as discussed below), a determination may be made whether the test script has passed or failed. In some implementations, the test script may be executed by a stored procedure within the database that is specially designed to execute test scripts. For example, such a stored procedure may take as a parameter the name of the test script or a list of names and test scripts to run. The stored procedure may note the actual result of the test script, such as by storing the actual result in a table.

At 408, within the database, the actual result produced by the test script is compared with the expected result from the expected results table to determine a success condition associated with the execution of the test script. In some implementations, the success condition may be a Boolean value indicating whether the test passed or failed. In some implementations, an indication of the success condition may be provided to the user or system that initiated the running of the test script. The success condition may also be stored in a results table along with other information about the execution of the test script.

Figure 5:
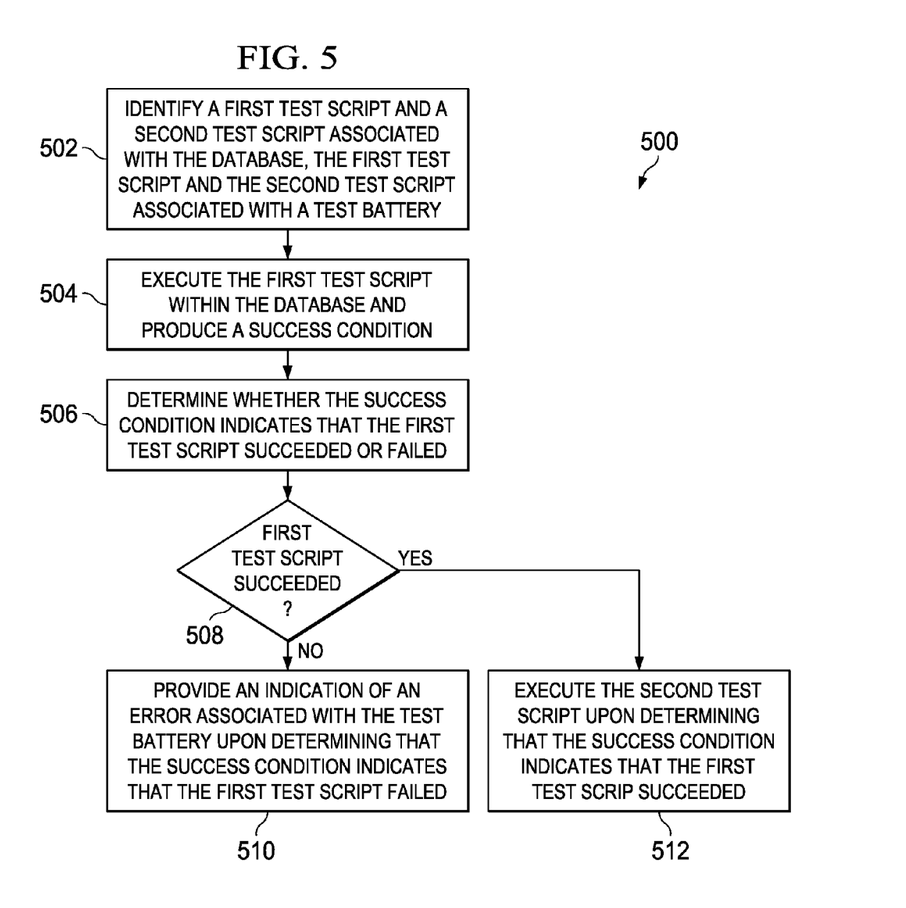
FIG. 5 is a flowchart of an example method for running a test battery including multiple test scripts.

FIG. 5 is a flowchart of an example method 500 for running a test battery including multiple test scripts. For clarity of presentation, the description that follows generally describes method 500 in the context of FIG. 1. However, it will be understood that method 500 may be performed, for example, by any other suitable system, environment, software, and hardware, or a combination of systems, environments, software, and hardware, as appropriate. For example, one or more of the database server, the client, or other computing device (not illustrated) can be used to execute method 500 and obtain any data from the memory of the client, the database server, or the other computing device (not illustrated).

At 502, a first test script and a second test script associated with the database are identified, where the first test script and the second test script are associated with a particular test battery. In some implementations, the first test script and second test script are associated with the test battery by annotations included within the first test script and the second test script. For example, the first test script and the second test script may both include the following annotation: "--@tests: group1." This annotation may indicate that the first test script and the second test script are associated with the "group1" test battery. At 504, the first test script is executed within the database and produces a success condition. At 506, a determination is made whether the success condition indicates that the first test script succeeded or failed. At 508, the method 500 branches based on whether the first test script succeeded or failed. If the first test script failed, the method 500 proceeds to 510, and an indication of an error associated with the test battery is provided. If the first test script succeeded, the method 500 proceeds to 512, and the second test script is executed.

Although the example method 500 describes a test battery including two test scripts, in some implementations the test battery may include a large number of test scripts (i.e., more than two). Such a configuration may allow for extensive testing to be performed with a single request, as all the test scripts associated with the test battery may be run by specifying the name of the test battery as previously discussed. This may save considerable time and effort as the large number of tests in the test battery need not be individually run.

The preceding figures and accompanying description illustrate example processes and computer implementable techniques. But environment 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
    identifying a test script stored in a first database, wherein the test script tests software code stored in and executed by the first database;
    identifying an expected result associated with the test script, the expected result stored in an expected results table in the first database;
    executing the test script within the first database by a test wrapper function stored in the first database, the test wrapper function receiving the test script as a parameter and configured to treat the test script as having failed when observing that the test script has taken longer than a maximum time to run, where executing the test script produces an actual result; and
    comparing, within the first database by the test wrapper function, the actual result produced by the test script with the expected result from the expected results table to determine a success condition associated with the execution of the test script within the first database;
    wherein identifying the test script, identifying the expected result, executing the test script, and comparing the actual result are performed internal to the first database without an external testing framework.

2. The method of claim 1, wherein the test script is a first test script, the method further comprising identifying a second test script stored in the first database, the first test script and the second test script associated with a test battery.

3. The method of claim 2, wherein the first test script and the second test script are associated with the test battery by a common annotation included within the first test script and the second test script.

4. The method of claim 2, further comprising:
    determining whether the success condition indicates that the first test script succeeded or failed; and
    executing the second test script upon determining that the success condition indicates that the first test script succeeded.

5. The method of claim 2, further comprising:
    determining whether the success condition indicates that the first test script succeeded or failed; and
    providing an indication of an error associated with the test battery upon determining that the success condition indicates that the first test script failed.

6. The method of claim 2, further comprising executing the second test script substantially simultaneously with the first test script.

7. The method of claim 1, wherein the test script includes one or more annotations, and wherein executing the test script further comprises:
    analyzing the one or more annotations; and
    modifying the execution of the test script based on the one or more annotations.

8. The method of claim 1, wherein executing the test script within the first database includes detecting an exception produced by the test script, and stopping execution of the test script in response to detecting the exception.

9. The method of claim 1, wherein executing the test script within the first database includes inserting the actual result produced by the test script into a test results table.

10. The method of claim 9, wherein comparing the actual result produced by the test script with the expected result from the expected results table includes executing a query against the expected results table and the test results table to compare the expected result to the actual result.

11. The method of claim 1, wherein identifying the expected result includes:
    reading a parameter from within a request to execute the test script; and
    adding the parameter to the expected results table prior to execution of the test script.

12. A computer program product encoded on a tangible, non-transitory storage medium, the computer program product comprising computer readable instructions for causing one or more processors to perform operations comprising:
    identifying a test script stored in a first database, wherein the test script tests software code stored in and executed by the first database;
    identifying an expected result associated with the test script, the expected result stored in an expected results table in the first database;
    executing the test script within the first database by a test wrapper function stored in the first database, the test wrapper function receiving the test script as a parameter and configured to treat the test script as having failed when observing that the test script has taken longer than a maximum time to run, where executing the test script produces an actual result; and comparing, within the first database by the test wrapper function, the actual result produced by the test script with the expected result from the expected results table to determine a success condition associated with the execution of the test script within the first database;

wherein identifying the test script, identifying the expected result, executing the test script, and comparing the actual result are performed internal to the first database without an external testing framework.

13. The computer program product of claim 12, wherein the test script is a first test script, the operations further comprising identifying a second test script stored in the first database, the first test script and the second test script associated with a test battery.

14. The computer program product of claim 13, wherein the first test script and the second test script are associated with the test battery by a common annotation included within the first test script and the second test script.

15. The computer program product of claim 13, the operations further comprising:
   determining whether the success condition indicates that the first test script succeeded or failed; and
   executing the second test script upon determining that the success condition indicates that the first test script succeeded.

16. The computer program product of claim 13, the operations further comprising:
   determining whether the success condition indicates that the first test script succeeded or failed; and
   providing an indication of an error associated with the test battery upon determining that the success condition indicates that the first test script failed.

17. The computer program product of claim 13, the operations further comprising executing the second test script substantially simultaneously with the first test script.

18. The computer program product of claim 12, wherein the test script includes one or more annotations, and wherein executing the test script further comprises:

analyzing the one or more annotations; and
modifying the execution of the test script based on the one or more annotations.

19. The computer program product of claim 12, wherein executing the test script within the first database includes detecting an exception produced by the test script, and stopping execution of the test script in response to detecting the exception.

20. A system, comprising:
memory for storing data; and
one or more processors operable to:
   identify a test script stored in a first database, wherein the first database is stored in the memory, and wherein the test script tests software code stored in and executed by the first database;
   identify an expected result associated with the test script, the expected result stored in an expected results table in the first database stored in the memory;
   execute the test script within the first database stored in the memory by a test wrapper function stored in the first database, the test wrapper function receiving the test script as a parameter and configured to treat the test script as having failed when observing that the test script has taken longer than a maximum time to run, where executing the test script produces an actual result; and
   compare, within the first database stored in the memory by the test wrapper function, the actual result produced by the test script with the expected result from the expected results table to determine a success condition associated with the execution of the test script within the first database;
   wherein identifying the test script, identifying the expected result, executing the test script, and comparing the actual result are performed internal to the first database without an external testing framework.

* * * * *